S. M. FULTON.
DRAW-COUPLINGS FOR BOATS, &c.
No. 189,854. Patented April 24, 1877.
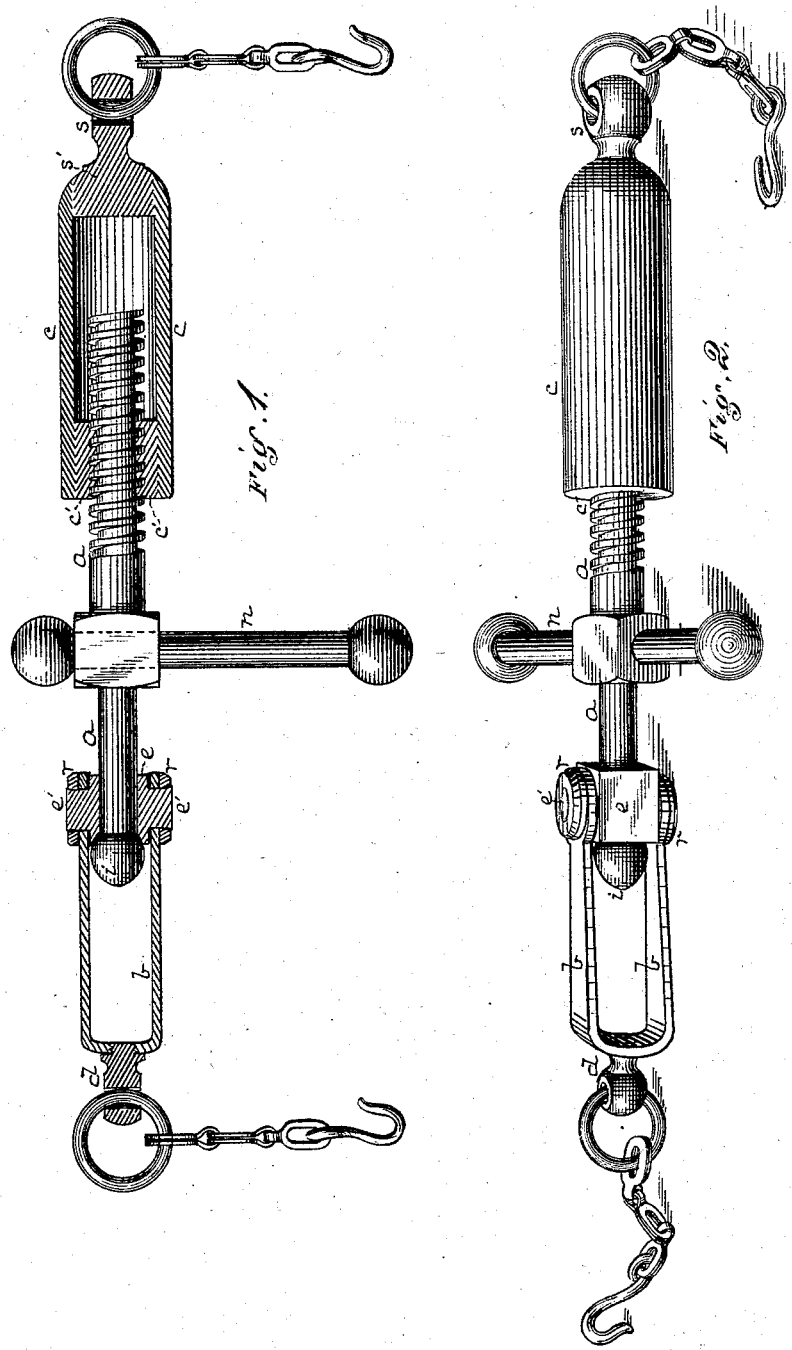

UNITED STATES PATENT OFFICE.

SAMUEL M. FULTON, OF PITTSBURG, PENNSYLVANIA.

IMPROVEMENT IN DRAW-COUPLINGS FOR BOATS, &c.

Specification forming part of Letters Patent No. 189,854, dated April 24, 1877; application filed December 30, 1876.

*To all whom it may concern:*

Be it known that I, SAMUEL M. FULTON, of Pittsburg, county of Allegheny, State of Pennsylvania, have invented or discovered a new and useful Improvement in Draw-Couplings; and I do hereby declare the following to be a full, clear, concise, and exact description thereof, reference being had to the accompanying drawing, making a part of this specification, in which—like letters indicating like parts—

Figure 1 is a plan view of my improved draw coupling partly in section, and Fig. 2 is a perspective view of the same.

In making up fleets and tows on our Western rivers it is very essential that the flats, boats, or barges, of which they are composed, should be bound together as tightly as possible, so as to form a practically solid or rigid body.

My improved draw-coupling is designed to assist in accomplishing this object. It consists of a shaft, $a$, threaded at one end with either one or more threads, as may be desired, with a nut, $c'$, working thereon, and having at its opposite end a loose block or swivel, $e$. This block is fitted to the shaft, as shown, so as to turn freely thereon, and is secured, as against end strain, by the head or nut $i$, or by any like device adapted to the purpose. A stirrup, $b$, is pivoted at its open end to trunnions $e'$ on opposite sides of the block $e$, and held thereon by collars or washers $r$, shrunk or upset on the ends of the trunnions, or by nuts screwed on and locked in any suitable way.

To the outer or closed end of the stirrup is riveted, or otherwise fastened, for the sake of convenience, a ring and staple, $d$, with cable and hook attached; but I do not consider this essential, as connection may be made to the stirrup without it.

Instead of an ordinary nut working on the theaded end of the shaft $a$, with stirrup attached, I make the attachment at that end by taking a piece of gas-pipe, or other suitable tubing of the proper diameter and desired length, as represented at $c$, and into one open end I weld a cylindrical nut, $c'$, which works upon the thread of the shaft, and into the opposite end is welded the stem $s'$ of a staple and ring, $s$, with cable and hook attached, as shown. A closed barrel or sleeve is thus formed, as shown in Fig. 2, within which the threaded end of the shaft is inclosed, as the nut and barrel $c$ $c'$ are screwed upon the shaft.

By this device the screw is protected more perfectly from ice freezing upon it in winter, and from injuries which it is liable to receive in the rough usage to which such implements are subjected, and also the oil or other lubricating substance is much better preserved, and less liable to soil other articles with which the coupling may come in contact; also, the cost of making the same is comparatively small. While I consider it best to weld the nut $c'$ and stem $s'$ in place it is obvious that other known equivalent means of securing rigid connections may be substituted therefor.

A handle, $n$, working loosely through a block on the shaft $a$, is provided for rotating the shaft.

My draw-coupling is operated in the usual way, and, while particularly designed for the use described, it is also applicable to like use in drawing together, as well as holding together, other heavy objects, and such uses are included herein.

I claim herein as my invention—

The barrel $c$, having a threaded nut, $c'$, secured in one end, the stem $s'$ of a connecting device in the other, in combination with shaft $a$, swiveled block $e$, and stirrup $b$, substantially as set forth.

In testimony whereof I have hereunto set my hand.

SAMUEL M. FULTON.

Witnesses:
J. J. MCCORMICK,
CLAUDIUS L. PARKER.